(12) United States Patent
Pitt et al.

(10) Patent No.: US 8,128,020 B2
(45) Date of Patent: Mar. 6, 2012

(54) ACTIVE TWISTING OF AN AIRCRAFT LIFTING SURFACE VIA MODULATED CLAMPING OF SUBSTRUCTURE

(75) Inventors: Dale M. Pitt, St. Louis, MO (US); Nicholas Stephen Eckstein, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 1162 days.

(21) Appl. No.: 12/107,681

(22) Filed: Apr. 22, 2008

(65) Prior Publication Data

US 2009/0321558 A1 Dec. 31, 2009

(51) Int. Cl.
*B64C 3/52* (2006.01)
(52) U.S. Cl. .................................. 244/48; 244/99.11
(58) Field of Classification Search .............. 244/48, 244/39, 198, 201, 46, 90 R, 90 A, 99.11
See application file for complete search history.

(56) References Cited

U.S. PATENT DOCUMENTS

| | | | | |
|---|---|---|---|---|
| 1,145,013 A * | 7/1915 | Gallaudet | | 244/48 |
| 2,584,663 A * | 2/1952 | Bensen | | 416/147 |
| 2,622,826 A * | 12/1952 | Prince | | 244/7 B |
| 2,745,613 A * | 5/1956 | Bailey et al. | | 244/76 R |
| 3,561,702 A * | 2/1971 | Jones | | 244/16 |
| 3,666,210 A * | 5/1972 | Look et al. | | 244/218 |
| 4,330,100 A | 5/1982 | Elber | | |
| 4,577,815 A * | 3/1986 | Orazi | | 244/39 |
| 4,863,117 A * | 9/1989 | Riout | | 244/48 |
| 5,137,228 A * | 8/1992 | Vaughen | | 244/17.25 |
| 5,284,419 A * | 2/1994 | Lutz | | 416/132 R |
| 5,288,039 A * | 2/1994 | DeLaurier et al. | | 244/219 |
| 5,662,294 A * | 9/1997 | Maclean et al. | | 244/219 |
| 5,681,014 A * | 10/1997 | Palmer | | 244/219 |
| 5,807,207 A | 9/1998 | Hisano et al. | | |
| 6,000,660 A | 12/1999 | Griffin et al. | | |
| 6,089,503 A * | 7/2000 | Volk | | 244/48 |
| 6,116,539 A * | 9/2000 | Williams et al. | | 244/46 |
| 6,419,187 B1 * | 7/2002 | Buter et al. | | 244/35 R |
| 6,910,661 B2 * | 6/2005 | Dockter et al. | | 244/218 |
| 7,131,611 B2 * | 11/2006 | Ferman | | 244/39 |
| 7,384,016 B2 * | 6/2008 | Kota et al. | | 244/123.1 |
| 7,510,143 B1 * | 3/2009 | Bertelsen et al. | | 244/46 |
| 7,637,454 B2 * | 12/2009 | Pitt | | 244/48 |
| 7,789,343 B2 * | 9/2010 | Sarh et al. | | 244/46 |
| 7,798,443 B2 * | 9/2010 | Hamilton et al. | | 244/99.8 |
| 7,866,610 B2 * | 1/2011 | Bousfield | | 244/218 |
| 7,883,060 B2 * | 2/2011 | Phillips | | 244/203 |
| 2008/0149779 A1 * | 6/2008 | Phillips | | 244/201 |
| 2009/0026321 A1 * | 1/2009 | Sarh et al. | | 244/218 |
| 2010/0148010 A1 * | 6/2010 | Hunter | | 244/199.4 |

OTHER PUBLICATIONS

Wikipedia, "X-53 Active Aeroelastic Wing", http://en.wikipedia.org/wiki/X-53_Active_Aeroelastic_Wing.html, 2 pgs.

* cited by examiner

*Primary Examiner* — Benjamin P Lee
(74) *Attorney, Agent, or Firm* — Caven & Aghevli LLC

(57) ABSTRACT

A system and method for enabling controlled twisting of a tip of a wing in response to the aerodynamic forces experienced by the wing. The structural stiffness of the wing is modulated to modulate the twist of the wing in the presence of aerodynamic forces.

20 Claims, 4 Drawing Sheets

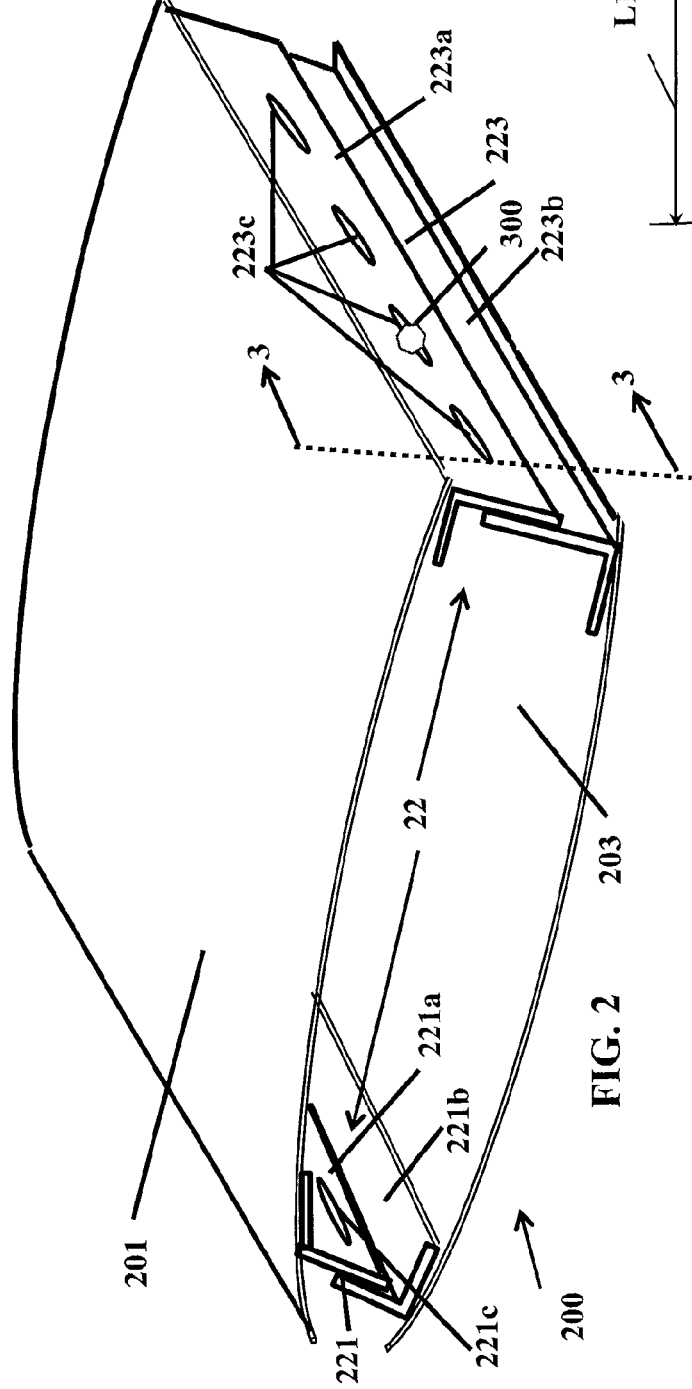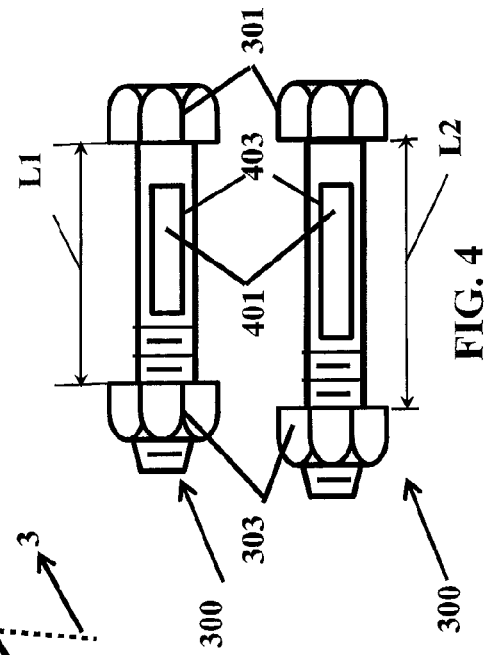

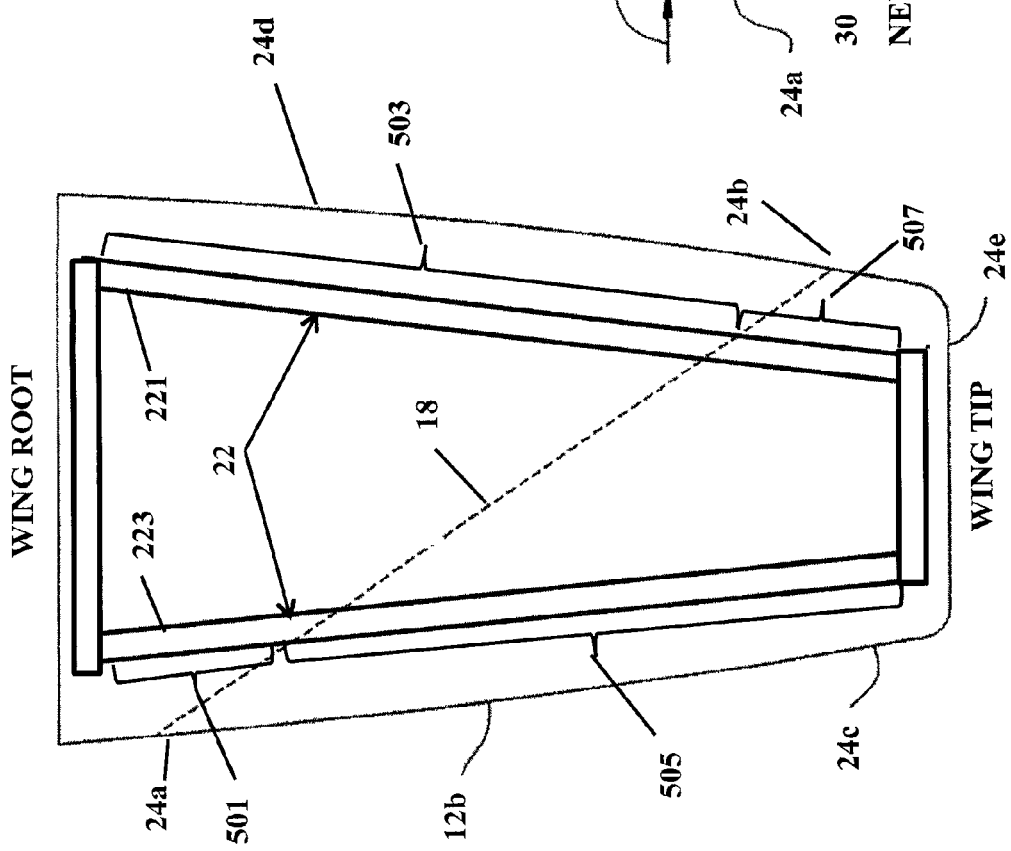
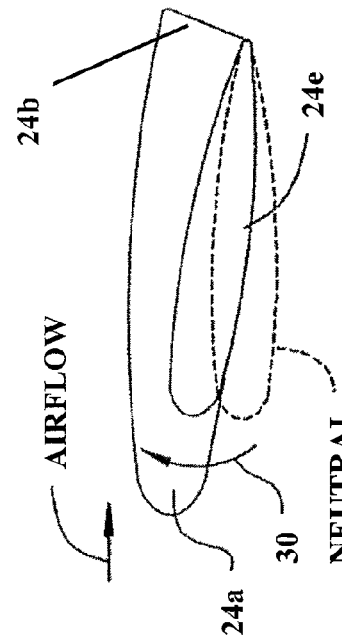
FIG. 5
FIG. 6

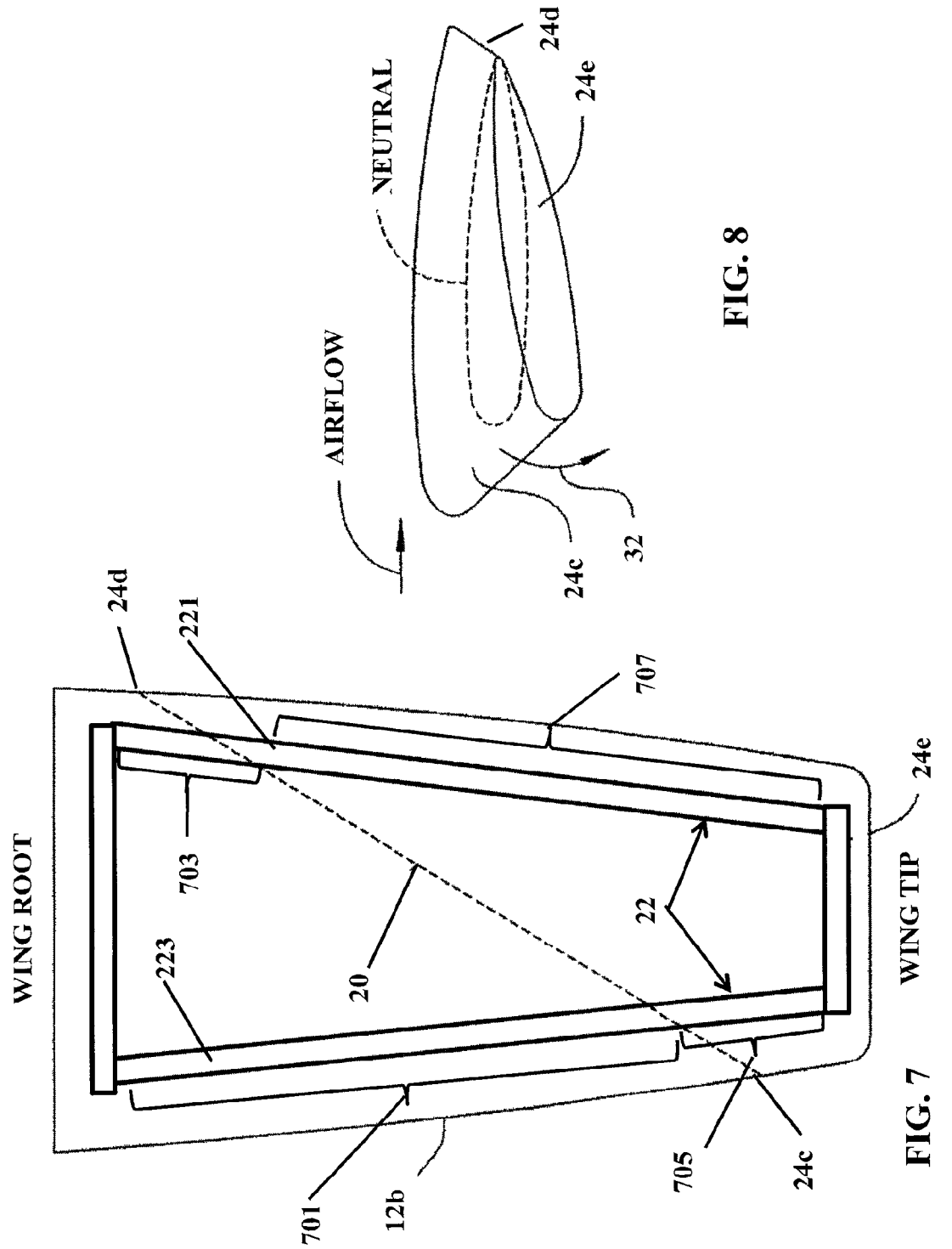

ACTIVE TWISTING OF AN AIRCRAFT LIFTING SURFACE VIA MODULATED CLAMPING OF SUBSTRUCTURE

FIELD

The present disclosure generally relates to airborne mobile platforms, and more particularly to controlling the chordwise stiffness of the wings on a mobile platform in a manner that allows the natural aerodynamic bending forces experienced by the wings during flight to twist the wings as needed in a controlled fashion, to assist in controlling flight of the mobile platform.

BACKGROUND

Aircraft designers are tasked with developing efficient technologies for controlling an aircraft flight path. In the earliest years of aviation, the Wright brothers used mechanical wires to twist the wing for aircraft roll control. Traditionally, aircraft have used moveable flap-like control surfaces (ailerons) to roll the aircraft or adjust the aircraft attitude.

Recently, aircraft designers have started to devise ways of controlling and using aircraft aero-elastic wing twisting for roll control. This has involved using such components as torque tubes disposed in each wing, and running substantially the full span-wise length of the wings, to assist in twisting the wings to help provide flight control maneuvering for the aircraft. The torque that is applied must overcome the aerodynamic load and the wing torsional stiffness resistance. A large actuation force is required to develop the applied torque.

The torque tube concept requires a very large torsion actuator to twist the wing, and is heavier than a normal wing design.

An additional approach is to use the differential deflection of leading and trailing edge control surfaces to twist the wing, such as has been accomplished with the U.S. Air Force/NASA Active Aeroelastic Wing.

Solutions such as the Air Force/NASA concept are very complex and heavy due to the many control actuators and discrete control surfaces required.

Accordingly, it would be highly advantageous to provide some means for controllably twisting a wing to assist in controlling flight of an aircraft, but without the complexity of prior approaches and/or the large, heavy and expensive wing twisting structures.

SUMMARY

The present disclosure relates to a system and method for controlling twisting of a wing of a mobile platform in response to the natural aerodynamic forces that the wing experiences during flight of the mobile platform. An aircraft wing having a controllable structural stiffness for adjusting its shape is provided. The wing comprises an upper wing surface having at least one upper spar associated therewith. The wing comprises said upper wing surface a lower wing surface having at least one lower spar associated therewith. A plurality of fasteners connects the upper spar and the lower spar. At least one of the fasteners comprises an adjustable clamp movable between a clamped position wherein the upper spar and the lower spar are secured at the clamp for fixing the shape of the wing and an unclamped position wherein the upper spar and the lower spar are relatively movable at the clamp for adjusting the shape of the wing.

An aircraft wing comprising in accordance with one embodiment comprises upper and lower wing surfaces, a first substructure associated with the upper wing surface, and a second substructure associated with the lower wing surface. A plurality of selectively operable clamping assemblies couples the first and the second substructures. The clamping assemblies are operable to selectively control the structural stiffness of the wing.

A method for controlling a wing comprising an upper wing surface and a lower wing surface includes the steps of providing a first substructure associated with the upper wing surface; providing a second substructure associated with the lower wing surface; and providing a plurality of selectively operable clamping assemblies coupling the first and the second substructures. Selectively adjusting the clamping assemblies selectively controls the structural stiffness of the wing.

By controlling the structural stiffness of the wing, the twisting characteristics of the wing can be controllably changed in response to different flight conditions of the aircraft. The natural aerodynamic forces exerted on the wing during flight are used to assist in twisting the wing. By changing the structural stiffness, the tip of the wing can be made to twist such that a leading edge of the wing is twisted either downwardly or upwardly.

Further areas of applicability of the present disclosure will become apparent from the detailed description provided hereinafter. It should be understood that the detailed description and specific examples, while indicating various embodiments, are intended for purposes of illustration only and are not intended to limit the scope of the disclosure.

BRIEF DESCRIPTION OF THE DRAWINGS

The features, functions, and advantages of the invention can be achieved independently in various embodiments of the present invention or may be combined in yet other embodiments further details of which can be seen with reference to the following description and drawing figures in which, like reference designators identify like elements, and in which:

FIG. 2 is a simplified cross section perspective view of a portion of one of the wings shown in FIG. 1;

FIG. 3 is a cross-section through a wing spar taken along lines 3-3 of FIG. 2;

FIG. 4 is a side view of the bolt shown in FIG. 3 in both compressed and extended states;

FIG. 5 is a top planar view of a wing;

FIG. 6 is an end view of the wing of FIG. 5 illustrating the upward twisting at the tip of the wing as a result of the orientation of the hinge line shown in FIG. 5;

FIG. 7 is a top planar view of a wing; and

FIG. 8 is an end view of the wing of FIG. 7 illustrating the downward twisting at the tip of the wing as a result of the orientation of the hinge line shown in FIG. 7.

DETAILED DESCRIPTION

Figure 1:
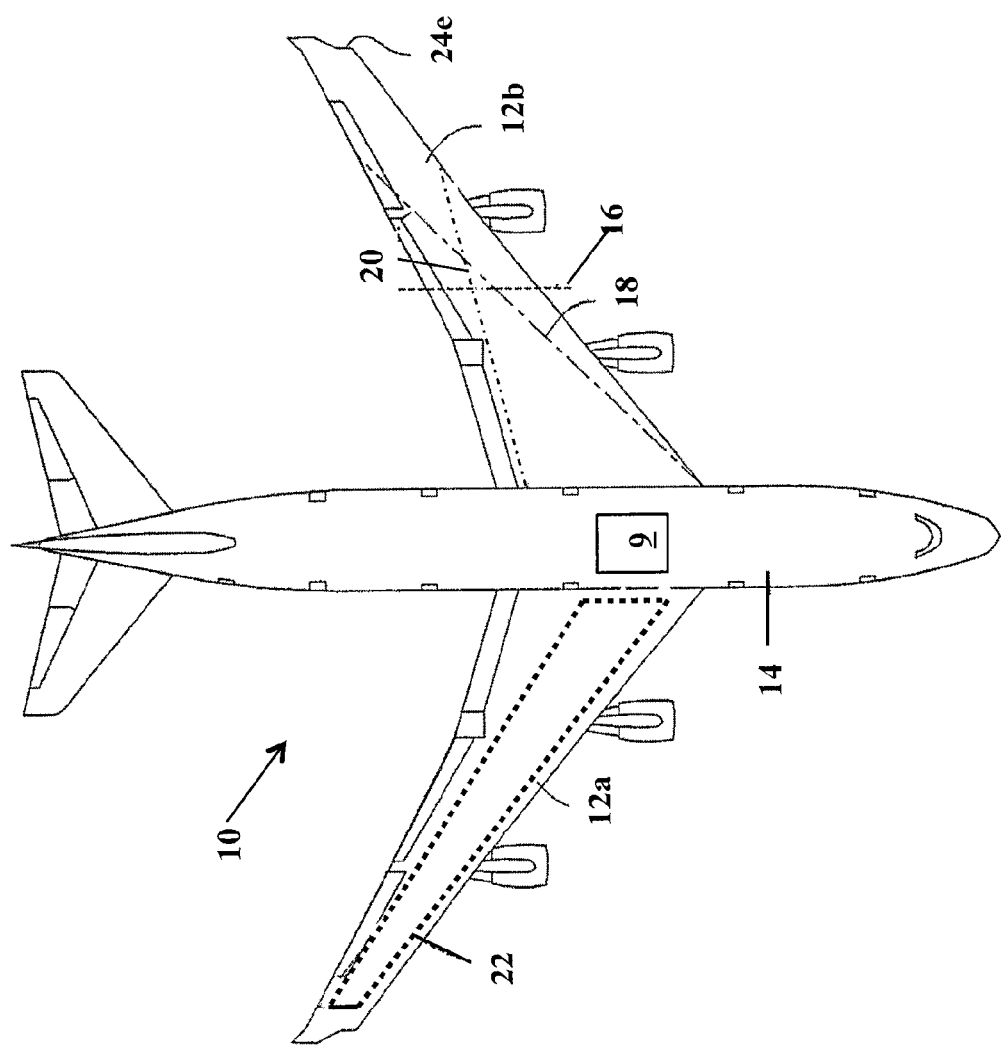
FIG. 1 is a perspective view of an aircraft with neutral, positive and negative hinge sweep lines illustrated by dashed lines on one of the wings.

The following description of the various preferred embodiment(s) is merely exemplary in nature and is in no way intended to limit the present disclosure, its application, or uses.

Referring to FIG. 1, there is shown an exemplary airborne mobile platform, in this example an aircraft 10, including a pair of wings 12*a* and 12*b*, and a body or fuselage portion 14. While an aircraft is illustrated, it will be appreciated that the present disclosure is applicable to any airborne mobile platform, manned or unmanned, that makes use of wings to control its flight.

Wing 12b of the aircraft 10 includes a "neutral" sweep hinge line shown as a dashed line 16. The neutral sweep hinge line can be viewed as representing the natural bending line of the wing as the wing experiences aerodynamic forces during flight. Dashed line 18 represents a "pseudo" wing hinge orientated to provide a negative sweep hinge line. Dashed line 20 represents another pseudo hinge line that is orientated to provide a positive sweep hinge line. It will be appreciated by those skilled in the art that a similar "neutral" sweep hinge line, a negative sweep hinge line, and a positive sweep hinge line may be shown on wing 12a, but are omitted in FIG. 1 for purposes of clarity.

Wing 12a is illustrated with a structural spar assembly 22 represented by dashed lines disposed inside the wing. It will be appreciated, however, that wing 12b similarly includes structural spar assembly 22, but the dashed lines indicating its presence have been deleted for clarity.

Turning now to FIG. 2, a portion 200 of wing 12a, is shown. Wing 12a includes upper wing skin 201 and the bottom wing skin 203. Structural spar assembly 22 comprises spar substructures 221, 223. Each spar substructure 221, 223 include an upper spar 221a, 223a and lower spar 221b, 223b. Each upper spar 221a, 223a includes elongated through apertures or slots 221c, 223c. Each corresponding lower spar 221b, 223b includes corresponding elongated through apertures or slots which are not visible in FIG. 2. Connecting upper spars 221a, 223a with corresponding bottom spars 221b, 223b are selectively actuatable clamping devices 300, one of which is shown in FIG. 2 and which extends through elongated through apertures or slots 221c, 223c.

Turning now to FIG. 3, a cross section of spar substructure 223 is shown. Upper spar 223a is disposed proximate lower spar 223b. Upper spar 223a includes elongated through aperture 223c which is disposed in alignment with elongated through aperture 223d of lower spar 223. Upper spar 223a and lower spar 223b are coupled or clamped together by a selectively actuatable clamping device 300.

Selectively actuatable clamping device 300 is an electrically actuatable fastener comprising a bolt 301 extending through apertures 223c, 223d, nut 303 and washers 305, 307.

Each bolt 301 that has a piezo-electric stack 401 disposed therein as shown in FIG. 4. Normally, nut 303 is torqued to a specific value that clamps the upper spar 223a together with lower spar 223b such that local stiffness is preserved in the resulting spar substructure 223 as a single "C" channel formed by upper spar 223 a and lower spar 223b. When the bolt torque is reduced bolt 300 is allowed to travel in the corresponding slots 223c, 223d and the local bending stiffness of spar substructure 223 is significantly reduced.

In the embodiment shown, each bolt 301 includes a piezo-electric stack 401 disposed within a cavity 403 of the shank of bolt 300. Applying a potential to piezo-electric stack 401 increases its length from an initial length L1 to an elongated length L2, thereby the grip length of bolt 300 between the bolt head and the nut 303 loosening its hold on upper spar 223a and lower spar 223b.

In an alternate embodiment, one or both of washers 305, 307 is a piezo-electric stack that expands and/or contracts when an electrical potential is applied thereto thereby changing the bolt torque and reducing the preload force on the spar substructures 221, 223.

Thus, in the embodiment, the spar assembly 22 includes spar substructures 221, 223 that each comprise upper and lower spars that are clamped together along their respective lengths in a plurality of regions by selectively actuatable clamping devices 300. By selectively varying the clamping tension or force of selectively actuatable clamping devices 300 an area of virtual flexure or softness is provided that allows the wing to twist. Reducing torque or bolt preload in spar substructures 221, 223, reduces spar stiffness and allows the respective upper spar 221a, 223a and corresponding respective lower spar 221b, 223b to slide thereby allowing the spar substructures 221, 223 to bend about the local soft area or flexure axis under aerodynamic wing load.

Turning back to FIG. 1, each wing 12a, 12b includes structural spar assembly 22, and each structural spar assembly is preferably independently controlled by a suitable flight control computer or other subsystem 9 carried on the aircraft 10.

Structural spar assembly 22 in each wing 12a, 12b may be controlled such that the orientation of the hinge line in each wing will be modified to provide either a negative hinge sweep, as indicated by dashed line 18, or a positive hinge sweep, as indicated by dashed line 20, or possibly any intermediate degree of hinge sweep between hinge lines 18 and 20. Controlled modification of orientation of the hinge line in each wing 12a and 12b allows the natural aerodynamic forces experienced by the wings during flight to assist in twisting the wings as needed to achieve the desired flight control characteristics. For example, during landing operations, a negative hinge sweep is desirable, while at cruise altitudes a neutral hinge sweep is most desirable. A particular advantage of the system and method described herein is that since the natural aerodynamic forces experienced by the wings provide a significant degree of the force needed to twist the wings 12a, 12b, that heavy, large and expensive motors and other like devices, that would otherwise be needed to twist the wings, are not needed with the present system and method.

Operation of the structural spar assemblies 22 will now be described with reference to FIGS. 5, 6, 7, and 8. As shown in FIG. 5, Structural spar assembly 22 comprises spar substructures 221, 223. As described above with respect to FIGS. 2, 3, and 4 each spar substructure 221, 223 include an upper spar 221a, 223a and lower spar 221b, 223b. Referring to FIG. 5, when the clamping devices 300, which are not shown in FIGS. 5, 6, 7 and 8 for clarity, are selectively actuated to change the clamping tensions or torques, the hinge sweep of each wing is selectively controlled. In FIG. 5, clamping devices 300 associated with leading edge spar substructure 223 are under reduced tension or torque in first regions 505, 507 and are under full tension or torque in second regions 501, 503. Upper spars 221a, 223a are allowed to slide against and with respect to lower spars 221b, 223b in first regions 505, 507. This results in a reduced stiffness flexure axis. The axis is swept from the inboard leading wing edge 24a to the outboard trailing wing edge 24b. This flexure axis location 18 allow the wing to bend upward under normal aerodynamic load. Flexure location 18 also allows the wing to twist around the flexure axis. The wing tip 24e twists up in the direction 30 shown in FIG. 6. Once the wing is twisted in the desired shape, all clamping devices can be torqued or tightened to retain the desired twist shape of the wing.

The location of the flexure axis is virtual, in that the location can be changed by selectively changing the torque or tension of different patterns of clamping devices 300.

To make wing tip 24e twist in a different direction or with the wing tip leading edge down, the flexure axis is swept in a different direction as shown in FIG. 7.

As shown in FIG. 7, clamping devices 300 associated with leading edge spar substructure 223 are under reduced tension or torque in first regions 705, 707 and are under full tension or torque in second regions 701, 703. Upper spars 221a, 223a are allowed to slide against and with respect to lower spars 221b, 223b in first regions 705, 707. This results in a reduced stiffness flexure axis. The axis is swept from the outboard leading wing edge 24c to the inboard trailing wing edge 24d. This flexure axis location 20 allow the wing to bend upward under normal aerodynamic load. Flexure location 20 also allows the wing to twist around the flexure axis. The wing tip 24e twists down in the direction 32 shown in FIG. 8. Once the wing is twisted in the desired shape, all clamping devices can be torqued or tightened to retain the desired twist shape of the wing. The degree of twisting is at a maximum at the wing tip 24e.

It is a particular advantage of the present system that the natural aerodynamic forces acting on the wings 12a, 12b can be used to twist the tips of the wings 12a, 12b. Controlling the sweep of the hinge line on each wing 12a, 12b can contribute to producing highly maneuverable aircraft. The ability to controllably change the hinge line on each wing, using the natural aerodynamic forces experienced by the wing, rather than large, expensive and heavy motors or actuators, further enables the present system to be implemented on smaller, lighter aircraft where conventional wing twisting systems might not be possible, practical or cost effective.

In addition, by the use of electrically actuated clamping devices 300 such as piezo-electric devices, the operation of the clamping devices is nearly instantaneous and the power consumed is substantially less than in other arrangements. The wing twist can be varied continuously and substantially instantaneously by selectively modulating clamping devices 300 to achieve a desired pattern.

The embodiment of the invention actively changes the wing local stiffness by using active clamping. Piezo-electric bolts are used to form local soft areas or a flexure axis. The aerodynamic forces applied to the wing cause the wing to bend upwards and the resulting bending motion about the flexure axis results in the wing twisting. By modulating the clamping tensions or bolt torques the flexure axis location and sweep angle can be nearly instantaneously changed, resulting in instantaneously changing wing twist. The clamps can be tensioned or the bolts torqued to maintain the wing condition.

The embodiment of the invention allows the wing to be twisted for different optimal twists for the flight conditions of cruise, landing and take-off. The embodiment can also be utilized to control an aircraft in the roll axis by using wing differential twist, i.e., different twist distributions on the left wing versus the right wing will result in roll control.

The principles of the invention may be also applied to other aerodynamic control surfaces other than wings. The principles of the invention may be employed in stabilators/horizontal tail, winglets, raked-tips, and vertical tails.

Although the illustrative embodiment has been described in terms of piezo-electric bolts and piezo-electric washers, it will be appreciated by those skilled in the art that other electrically actuated clamping apparatus may be employed advantageously also. For example, solenoid actuated clamping apparatus may also be employed in some applications.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. An aircraft wing having a controllable structural stiffness for adjusting its shape, the wing comprising:
    an upper wing surface;
    at least one upper spar coupled to said upper wing surface;
    a lower wing surface;
    at least one lower spar coupled to said lower wing surface;
    a plurality of fasteners for connecting said one upper spar and said one lower spar;
    at least one of said fasteners comprising an adjustable clamp movable between a clamped position wherein said one upper spar and said one lower spar are secured at said clamp for fixing the shape of said wing and an unclamped position wherein said one upper spar and said one lower spar are relatively movable at said clamp for adjusting the shape of said wing.

2. An aircraft wing in accordance with claim 1, wherein: said adjustable clamp comprises a bolt of adjustable grip.

3. An aircraft wing in accordance with claim 2, wherein: said one upper spar and said one lower spar each comprise aligned longitudinal slots receiving said bolt.

4. An aircraft wing in accordance with claim 2, wherein: said bolt is a piezo-electric bolt.

5. An aircraft wing in accordance with claim 1, wherein: each of said plurality of fasteners comprises a corresponding adjustable clamp selectively movable between a clamped position wherein said one upper spar and said one lower spar are secured together at said clamp for fixing the shape of said wing and an unclamped position wherein said one upper spar and said one lower spar are relatively movable at said clamp for adjusting the shape of said wing, each said adjustable clamp being spaced along said one upper spar and said one lower spar.

6. An aircraft wing in accordance with claim 5, comprising:
    a second upper spar associated with said upper wing surface;
    a second lower spar associated with said lower wing surface;
    a plurality of second fasteners for connecting said second upper spar and said second lower spar;
    at least one of said second fasteners comprising an adjustable second clamp movable between a clamped position wherein said second upper spar and said second lower spar are secured at said clamp for fixing the shape of said wing and an unclamped position wherein said second upper spar and said second lower spar are relatively movable at said second clamp for adjusting the shape of said wing.

7. An aircraft wing in accordance with claim 6, wherein: a bending axis of said wing is defined by selectively controlling said first fasteners and selectively controlling said second fasteners.

8. An aircraft wing in accordance with claim 7, wherein: aerodynamic forces bend said wing about said bending axis and produce a predetermined twist in said wing.

9. An aircraft wing in accordance with claim 6, wherein: a first bending axis of said wing is defined by selectively controlling a first plurality of said first fasteners along and selectively controlling a first plurality of said second fasteners.

10. An aircraft wing in accordance with claim 9, wherein: a second bending axis of said wing is defined by selectively controlling a second plurality of said first fasteners along and selectively controlling a second plurality of said second fasteners.

11. An aircraft wing in accordance with claim 10, wherein: when said wing is subjected to aerodynamic forces, said first bending axis produces a twist in said wing in a first direction and said second bending axis produces a twist in said wing in a second direction.

12. An aircraft wing comprising:
    an upper wing surface;
    a first substructure extending from said upper wing surface;

a lower wing surface;

a second substructure extending from said lower wing surface;

a plurality of selectively operable clamping assemblies coupling said first and said second substructures and operable to selectively control the structural stiffness of said wing.

13. An aircraft wing in accordance with claim 12, wherein:

said plurality of selectively operable clamping assemblies are selectively operable to provide a controllable bending axis for said wing.

14. An aircraft wing in accordance with claim 13, wherein:

the clamping force of each of said plurality of selectively operable clamping assemblies is modulated to control twist of said aircraft wing in the presence of aerodynamic forces.

15. An aircraft wing in accordance with claim 12, wherein:

the clamping force of each of said plurality of selectively operable clamping assemblies is modulated to modulate the bending axis of said wing.

16. A method for controlling a wing comprising an upper wing surface and a lower wing surface, said method comprising:

providing a first substructure coupled to said upper wing surface;

providing a second substructure coupled to said lower wing surface;

providing a plurality of selectively operable clamping assemblies coupling said first and said second substructures; and selectively adjusting said clamping assemblies to selectively control the structural stiffness of said wing.

17. A method in accordance with claim 16, comprising:

controlling the bending axis of said wing with said clamping assemblies.

18. A method in accordance with claim 17, comprising:

controlling the twist of said aircraft wing in the presence of aerodynamic forces by modulating the clamping force of each of said plurality of selectively operable clamping assemblies.

19. A method in accordance with claim 17, comprising:

modulating the bending axis of said by selectively modulating the clamping force of each of said plurality of selectively operable clamping assemblies.

20. A method in accordance with claim 16, comprising:

controlling the twist of said aircraft wing in the presence of aerodynamic forces by selectively adjusting the structural stiffness of said wing.

* * * * *